United States Patent [19]

Ownby

[11] Patent Number: 4,968,647
[45] Date of Patent: Nov. 6, 1990

[54] FRACTURE TOUGHENING OF SINTERED DIAMOND AND CARBIDE CERAMICS

[75] Inventor: P. Darrell Ownby, Rolla, Mo.

[73] Assignee: Curators of the University of Missouri, Columbia, Mo.

[21] Appl. No.: 383,590

[22] Filed: Jul. 24, 1989

[51] Int. Cl.⁵ .............................................. C22C 26/00
[52] U.S. Cl. ...................................... 501/99; 501/86; 501/87; 501/91; 423/445
[58] Field of Search ....................... 501/86, 87, 88, 90, 501/91, 99; 423/445

[56] References Cited

U.S. PATENT DOCUMENTS 3,876,751 4/1975 Alexeevsky et al. .
4,394,170 7/1983 Sawsoka et al. .
4,695,321 9/1987 Akashi et al. .
4,771,022 9/1988 Block et al. .

OTHER PUBLICATIONS

Heuer and Ruhle, "Advances in Ceramics", vol. 12, *Science and Technology of Zirconia II*, pp. 1-32.
Green, Hannink and Swain, *Transformation Toughening of Ceramics*, CRC Press (1989), pp. 1-55 and 157-197.
J. A. Cer. Soc., vol. 68, pp. C36-C37 (1985).

*Primary Examiner*—William R. Dixon, Jr.
*Assistant Examiner*—Chris Gallo
*Attorney, Agent, or Firm*—Wood, Herron & Evans

[57] ABSTRACT

High pressure sintered bodies of polycrystalline diamond or carbide ceramics are rendered more resistant to cracking by establishing dispersed, localized "stress centers" of submicron size particles of lonsdaleite, diamond, or other form of metastable, high density carbon which has the capability of transforming crystallographically to graphite in situ in the body. When an incipient crack in the body approaches entrapped metastable particles along its path, the crack promotes or permits transformation of the metastable particles to graphite particles, with concomitant increase in their size, thereby resisting further propagation of the crack.

22 Claims, 1 Drawing Sheet

FRACTURE TOUGHENING OF SINTERED DIAMOND AND CARBIDE CERAMICS

FIELD OF THE INVENTION

This invention relates to the toughening of polycrystalline diamond and ceramic carbides to improve their fracture toughness (crack propagation resistance).

BACKGROUND OF THE INVENTION

Polycrystalline diamond materials, along with ceramic carbides such as silicon carbide, tungsten carbide, and boron carbide, are among the hardest materials known. Fine grained bodies made by compacting and sintering or hot pressing particles of these compositions are widely used for cutting tools, as in turning and milling; in grinding, sawing, drilling and dressing; and in other applications such as in armour. Their great hardness notwithstanding, however, such sintered bodies are relatively brittle and tend to crack and fracture more readily than some other materials which are not as hard.

There has therefore been a need for a "tougher" form of such ultrahard materials, which can better resist fracture by cracking.

THE PRIOR ART

Heuer and Ruhle in "Advances in Ceramics", Vol. 12, *Science & Technology of Zirconia II*, edited by Nils Claussen, Manfred Ruhle and Arthur H. Heuer, published by the American Ceramic Society, pp. 1–32 (1984); and Green, Hannink & Swain, *Transformation Toughening of Ceramics*, CRC Press (1989), describe the so-called "transformation toughening" of alumina and other oxide ceramics, in which unstabilized or partially stabilized zirconia particles are dispersed in a dense ceramic matrix which is densified around them by high temperature fabrication. Upon cooling to room temperature, the unstabilized zirconia particles tend to transform martensitically to a low temperature, higher volume monoclinic phase. Depending upon conditions, this can result in an increase in mechanical properties of the ceramic matrix. Especially enhanced is the fracture toughness parameter ($K_{IC}$), which is a stress intensity factor that measures the ability of the material to resist the propagation of a crack through it.

Zirconia is an oxide and as such is incompatible with many non-oxide ceramics at the high temperatures required to sinter them. For example, silicon carbide and other carbide ceramics which have great utility as cutting tools, abrasives and armour because of their extreme hardness, react grossly with zirconia at the temperatures required for sintering. For this reason transformation toughening of such non-oxide ceramics by zirconia and other oxide tougheners such as dysprosia and hafnia has not been very successful.

Block U.S. Pat. No. 4,771,022 teaches another process for toughening ceramics with dispersed particles such as zirconia or hafnium oxide, having a metastable phase at ambient temperature. In that process the stable phase powder is subjected to extreme pressure (more than 3.37 GPa) to convert part of it martensitically into the metastable (tetragonal II) form, which is then pressure sintered at a temperature below 500° C. while maintaining extremely high compression to form a compact, followed by reducing the pressure and cooling.

Alumina ceramics have been strengthened by incorporating dispersed diamond particles in an alumina matrix during high pressure, high temperature fabrication of alumina parts, J. A. Cer. Soc., Vol. 68, pages C36–C37, 1985. During hot pressing and reannealing the diamond particles tend to transform to more stable but higher volume graphite particles. Two major problems exist with that technique:

(1) diamond is not chemically compatible with an oxide matrix such as alumina, as it tends to react with the alumina at the high temperatures required for densification;

(2) the fracture toughness of alumina is enhanced to a far greater degree by the zirconia particle technique than by diamond particle dispersion.

Akashi U.S. Pat. No. 4,695,321 teaches reacting "high pressure diamond phase" particles with an exothermically reactive additive. This sets up a shock compression wave that reduces the high pressure diamond phase to a low pressure phase, which becomes interpartically bonded and chemically reacted with the other particles.

SUMMARY OF THE INVENTION

This invention provides a means of toughening certain materials which cannot be effectively toughened by zirconia particles, namely polycrystalline diamond bodies, and carbide ceramics such as silicon carbide, tungsten carbide and boron carbide. (These materials are referred to herein as "ultrahard carbon-based materials".) The invention uses, as a toughening agent, metastable particles of lonsdaleite or another high density form of carbon which, like lonsdaleite, is metastable at room temperature and which tends to convert in situ by transformation to graphite at elevated use temperature or upon heating above about 1000° C. The metastable particles are incorporated in a densified, sintered body of the hard ceramic matrix in a manner which confines each individual metastable particle in a volume that is characteristic of its high density form, which volume restricts it from completely transforming to graphite until the highly compressive stress field around it is released, as by cracking. When a crack starts to form and grow (referred to as an "incipient crack") toward or around a metastable particle, it releases the stress around the particle. This causes the metastable particle to transform to the more stable, less dense graphite form. The conversion takes place especially rapidly in the case of lonsdaleite, because it transforms by displacement. (In contrast to diffusion transformation, the displacive transformation merely distorts the lattice and involves no disruption of nearest neighbor bonds. It is usually diffusionless, requires a much lower activation energy. Hence its kinetics are much faster.) The resulting graphite particle has a lower density, i.e., a higher volume, than its precursor. It is this increase in dispersed particle volume, and/or the release of pre-existing localized stress centers along the path of the crack, which is believed to stop propagation of the crack. The ceramic is thus "toughened" by reason of its enhanced ability to resist cracking, in comparison to the same material without the dispersed metastable particles.

The metastable high density carbon particles are chemically compatible with polycrystalline diamond and carbide materials; no reaction between them occurs, even at the high pressure and temperature conditions which must be used to prevent their transformation while densifying and sintering the matrix particles together. (Correspondingly, this technique is not effective with ceramic materials with which the metastable form of carbon is chemically reactive, i.e., alumina and other oxides.)

Lonsdaleite is known per se. In its crystal structure the hexagonal rings of carbon atoms have a "boat" configuration, whereas in diamond they have a "chair" form and in graphite they are planar. Both diamond and lonsdaleite are much harder and denser than graphite:

|  | Mohs Hardness | Density | Est. Volume Change On Transformation To Graphite Under Pressure |
|---|---|---|---|
| Lonsdaleite | 10 | 3.52 gms/cc | +31% |
| Diamond | 10 | 3.52 | +31% |
| Graphite | 2 | 2.25 | 0 |

Lonsdaleite is metastable at room temperature conditions, that is, it tends to convert to graphite. The reaction kinetics increase rapidly with temperature. As it converts under pressure in situ to graphite, lonsdaleite undergoes an estimated 31% increase in volume.

Lonsdaleite, which is known per se, exists in meteorites and can be formed synthetically by extremely high load rate (explosive) forming. While lonsdaleite is the preferred metastable form of carbon for use herein, it has also been demonstrated that explosively produced diamonds such as those sold by duPont under the trademark "Mypolex" can be used as the toughening agent. These are distorted diamonds which have properties between man-made diamond and lonsdaleite, and are produced by encasing carbon powder and copper particles in a container and explosively imploding the container, for example as disclosed in U.S. Pat. Nos. 3,399,254; 3,401,019; and 3,348,918. It is also contemplated that other forms of man-made (synthetic) diamonds can be used to toughen the carbide ceramics, although their rate of transformation is not so fast as lonsdaleite. As used herein, the term "metastable high density carbon" is intended to mean and include lonsdaleite, explosively produced distorted diamond, and other forms of conventional and natural man-made diamond.

The lonsdaleite or other metastable high density carbon particles should be of submicron particle size, less than $10^{-4}$ cm. in diameter, and preferably finer still, of the order of $10^{-6}$ to $10^{-7}$ cm.

The invention can best be further described by reference to the accompanying drawings in which, FIG. 1 is a diagrammatic illustration, greatly enlarged in size, of a ceramic body having metastable particles dispersed in it in accordance with the invention; and FIG. 2 is a diagram showing generally how the toughening factor $K_{IC}$ changes with volume % of diamond present in the ceramic.

DETAILED DESCRIPTION

Figure 1:
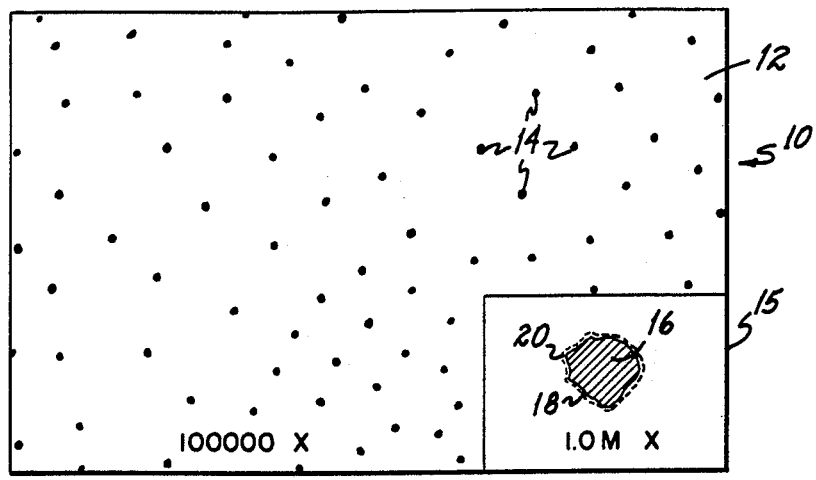

In FIG. 1 the body 10 comprises a matrix 12 of polycrystalline diamond or carbide particles, not shown individually, in which are dispersed still smaller metastable particles 14 of high pressure carbon. The drawing represents a magnification of roughly about 100,000x. The insert area 15 in FIG. 1 represents a greater enlargement of a portion of body 10, at about $10^6$x, and represents a single metastable particle 16 of high pressure carbon. The volume of the metastable particle 16 (before transforming) is represented by solid line 18; when the particle transforms to the more stable, higher volume form, its size increases, as represented by dashed line 20.

The following examples show the presently preferred practice of the invention.

EXAMPLE 1

SiC powder (nominally of approx. micron size) was mixed with duPont Mypolex distorted diamond particles in volume percentages of 0; 10.2; 18.5; 25.2; and 31.3%, in aqueous powder suspension. The SiC and distorted diamond suspensions were subjected to ultrasonic vibration to provide thorough mixing, as the suspending liquid was evaporated. The mixed powder was hot pressed in a cubic press, encapsulated in a molybdenum container, at 55 KB and 1500° C. for 5 to 15 minutes. A description of a hot pressing technique suitable for this purpose is given in U.S. Pat. No. 3,745,623, to which reference may be had.

After diamond polishing the specimens, they were cleaned in an ultrasonic cleaner to thoroughly remove the polishing media.

The fracture toughness stress intensity factor, $K_{IC}$, was measured by the diamond indentation method with a 30 Kg load. The results, given in Table 1, show substantially increased $K_{IC}$ by adding the diamond particles.

TABLE 1

Fracture toughness of SiC with different volume percents of Mypolex diamond, as measured by indentation method with a 30 Kg load:

| Volume % | | Measured by | |
|---|---|---|---|
| SiC | Diamond | U.M.R. Lab $K_{IC}$ (MPa m$^{\frac{1}{2}}$) | Independent Lab $K_{IC}$ (MPa m$^{\frac{1}{2}}$) |
| 100 | 0 | 2.8 | |
| 89.8 | 10.2 | 3.5 | |
| 81.5 | 18.5 | 7.1 | 7.5 |
| 74.8 | 25.2 | 7.1 | |
| 68.7 | 31.3 | 3.9 | |

Figure 2:
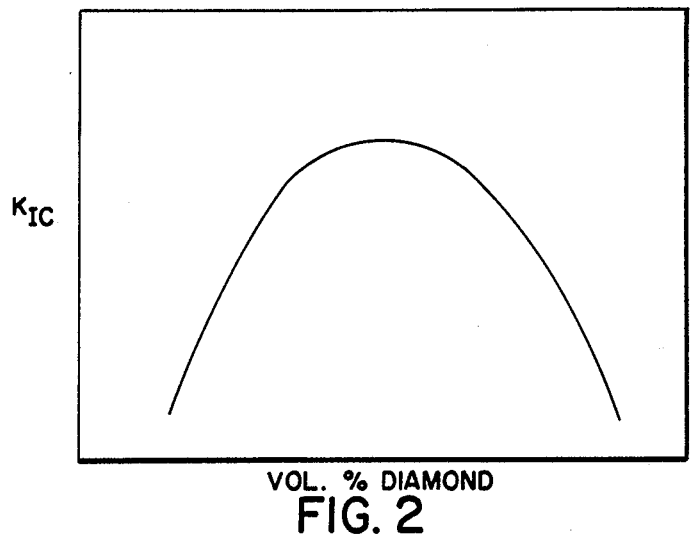

The change in $K_{IC}$ as a function of volume % diamond is shown graphically in FIG. 2.

EXAMPLE 2

Different particle sizes of 18.5 volume percent Mypolex diamond were mixed with sub-micron SiC powder. The mixing, sintering, and fracture toughness measurement methods were the same as described in Example 1. The results, given in Table 2, show that better toughness increase is obtained with very small ($10^{-6}$ cm.) metastable particles.

TABLE 2

Fracture toughness of SiC with 18.5 volume percent of different particle sizes of diamond, as measured by the indentation method with a 30 Kg load:

| Nominal Diamond particle size | Measured by | |
|---|---|---|
| | U.M.R. Lab $K_{IC}$ (MPa m$^{\frac{1}{2}}$) | IOndependent Lab $K_{IC}$ (MPa$^{\frac{1}{2}}$) |
| 5.0 × $10^{-6}$ cm | 3.1 | |
| 4.0 × $10^{-6}$ cm | 3.2 | |
| 3.0 × $10^{-6}$ cm | 2.9 | |
| 2.0 × $10^{-6}$ cm | 3.2 | |
| 1.1 × $10^{-6}$ cm | 7.1 | 7.5 |

Without intending to limit the invention to a particular theory of operation, it is my present belief that the remarkable improvement which is obtained is at least in part the result of a transformation conversion of the metastable particles in situ. That is, the metastable particles are theorized to be immobilized under compressive stress in the sintered matrix of the carbon-based material. When the compressive stress is released by an incipient crack in the matrix, the metastable particles are converted in situ to graphite particles of larger volume, and thereby toughen the body against fracture from the crack. However, it should also be noted that the observed toughening could be the result in part or even in whole, of crack diversion or crack blunting, with or without transformation conversion.

From the foregoing it can be seen that I have discovered a way to toughen ultra-hard but relatively brittle carbon-based materials which in practice cannot be usefully toughened by other known techniques, wherein the toughness develops in the body of the material, as a crack tries to progress.

Having described the invention, what is claimed is:

1. A method of producing a body of the class of ultra-hard carbon-based materials consisting essentially of polycrystalline diamond and carbide ceramics, comprising, forming submicron size particles of metastable high density carbon, dispersing said high density carbon particles in a mass of particles of said carbon-based material and forming a uniform mixture thereof;

compacting and sintering said mixture to form an integral dense body, said compacting and sintering being carried out at conditions of pressure sufficiently elevated to substantially prevent the metastable particles from transforming to graphite particles during the sintering, and cooling the sintered body to immobilize the metastable particles in a matrix of said carbon-based material, thereby toughening said body against fracture from a crack, said body having a substantially higher fracture toughness than a sintered body which is otherwise similar but which does not contain such metastable high density carbon particles.

2. The method of claim 1 wherein said metastable high density carbon particles are lonsdaleite.

3. The method of claim 1 wherein said metastable high density carbon particles are natural or man-made diamond.

4. The method of claim 1 wherein said carbon-based material is polycrystalline diamond.

5. The method of claim 1 wherein said carbon-based material is a carbide ceramic.

6. The method of claim 1 wherein said metastable high density carbon particles are no larger than $10^{-6}$ cm. in size.

7. The method of claim 1 wherein said compacting and sintering is carried out at pressure and temperature conditions corresponding to a pressure of about 55 kilobars and a temperature of about 1500° C.

8. The method of claim 1 wherein the proportion of said metastable high density carbon particles is 1 to 30 volume % of said mixture.

9. The method of claim 1 including the further step of subjecting the body to a load which starts to crack the body, such cracking transforming metastable high density carbon particles in the path of the crack to graphite particles of greater volume, thereby resisting further propagation of said crack.

10. The method of claim 1 wherein said high density carbon particles are metastable at room temperature, and upon temperature increase tend to transform to graphite with an accompanying increase in specific volume.

11. The method of claim 1 wherein said metastable carbon particles are placed under compressive stress in said matrix by said compacting and sintering.

12. The method of claim 11 wherein said metastable particles are converted in situ in said matrix to graphite particles of greater volume, by release of said compressive stress by an incipient crack in the matrix.

13. A fine grained sintered ceramic body comprising a dispersion of submicron size metastable high density carbon particles in a matrix of grains of a material of the class consisting of polycrystalline diamond and carbide ceramics, the grains of said material being a coherent body in which said metastable particles are dispersed, said body having a substantially higher fracture toughness than a sintered body which is otherwise similar but without said metastable high density carbon particles.

14. The body of claim 13 wherein said metastable high density carbon particles are lonsdaleite.

15. The body of claim 13 wherein said metastable high density carbon particles are natural or man-made diamond.

16. The body of claim 13 wherein said material is polycrystalline diamond.

17. The body of claim 13 wherein said material is a carbide ceramic.

18. The body of claim 13 wherein said metastable high density carbon particles are no larger than $10^{-6}$ cm. in size.

19. The body of claim 13 wherein the proportion of said metastable high density carbon particles is 1 to 30 volume % of said body, based on proportion as added.

20. The body of claim 13 wherein said metastable particles are convertible in situ in said matrix to graphite particles of higher volume in response to incipient cracking of the matrix, thereby to toughen said body against fracture.

21. The method of claim 1 wherein the proportion of said metastable high density carbon particles is in the range of 18.5 to 25.2 volume percent of said mixture.

22. The body of claim 13 wherein the proportion of said metastable high density carbon particles is in the range of 18.5 to 25.2 volume percent of said mixture, based on proportion as added.

* * * * *